US012810096B2

(12) United States Patent
Hashimoto et al.

(10) Patent No.: US 12,810,096 B2
(45) Date of Patent: Nov. 24, 2026

(54) IMAGE PROCESSING APPARATUS, NON-TRANSITORY COMPUTER READABLE MEDIUM, AND METHOD FOR CONTROLLING IMAGE PROCESSING APPARATUS

(71) Applicant: FUJIFILM Business Innovation Corp., Tokyo (JP)

(72) Inventors: Takayuki Hashimoto, Kanagawa (JP); Daiki Takazawa, Kanagawa (JP); Masaki Nudejima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/363,254

(22) Filed: Aug. 1, 2023

(65) Prior Publication Data

US 2024/0265222 A1 Aug. 8, 2024

(30) Foreign Application Priority Data

Feb. 8, 2023 (JP) ................................ 2023-017966

(51) Int. Cl.
*G06F 15/00* (2006.01)
*G03G 15/00* (2006.01)
(Continued)

(52) U.S. Cl.
CPC ......... *G06K 15/1817* (2013.01); *G03G 15/50* (2013.01); *G06K 15/1266* (2013.01); *G06K 15/129* (2013.01)

(58) Field of Classification Search
None
See application file for complete search history.

(56) References Cited

U.S. PATENT DOCUMENTS 6,118,463 A * 9/2000 Houki .................... H04N 1/506 347/116
9,195,160 B2 * 11/2015 Morita .................. H04N 1/603
(Continued)

FOREIGN PATENT DOCUMENTS

JP H08-241393 A 9/1996
JP 2011-142530 A 7/2011
(Continued)

OTHER PUBLICATIONS

Sep. 29, 2026 Office Action issued in Japanese Patent Application No. 2023-017966.

*Primary Examiner* — Mark R Milia
(74) *Attorney, Agent, or Firm* — Oliff PLC

(57) ABSTRACT

An image processing apparatus includes: a memory; a processor; and a first cache memory used by the processor. The processor is configured to: store, in the first cache memory, pixel data items arranged in a line in a main-scanning direction, the pixel data items being stored in units of multiple lines; execute a shift process on multiple pixel data items stored in the first cache memory for each of pixel blocks to prevent deviation in a sub-scanning direction in forming an image, the pixel block being composed of a predetermined number of pixel data items and serving as a processing unit; and perform a storing process in which among the pixel data items in the multiple lines that are stored in the first cache memory, pixel data items to be stored in an area with consecutive addresses in the memory as a result of the shift process are collectively stored in the memory.

8 Claims, 10 Drawing Sheets

(51) Int. Cl.

| | |
|---|---|
| ***G06K 15/02*** | (2006.01) |
| ***G06K 15/12*** | (2006.01) |

(56) References Cited

U.S. PATENT DOCUMENTS

2014/0268253 A1* 9/2014 Itou .................... H04N 1/32358
358/474
2019/0281248 A1* 9/2019 Oue .................... H10F 39/8023

FOREIGN PATENT DOCUMENTS

| | | | |
|---|---|---|---|
| JP | 2012-168372 | A | 9/2012 |
| JP | 2017-118454 | A | 6/2017 |
| JP | 2017-123569 | A | 7/2017 |
| JP | 2019-161338 | A | 9/2019 |

* cited by examiner

IMAGE PROCESSING APPARATUS, NON-TRANSITORY COMPUTER READABLE MEDIUM, AND METHOD FOR CONTROLLING IMAGE PROCESSING APPARATUS

CROSS-REFERENCE TO RELATED APPLICATIONS

This application is based on and claims priority under 35 USC 119 from Japanese Patent Application No. 2023-017966 filed Feb. 8, 2023.

BACKGROUND

(i) Technical Field

The present disclosure relates to an image processing apparatus, a non-transitory computer readable medium, and a method for controlling an image processing apparatus.

(ii) Related Art

Japanese Unexamined Patent Application Publication Nos. 2012-168372 and 2019-161338 disclose technology for improving memory access performance in an image forming apparatus that corrects registration deviation in image data with a predetermined resolution.

SUMMARY

Processing for transferring data regarding a corrected image subjected to a shift process to a memory has been performed. In the shift process, one or more pixel data items are shifted to prevent deviation in a sub-scanning direction in image forming for each of pixel blocks. Each pixel block is composed of a predetermined number of pixel data items and serves as a unit of processing.

Each pixel data item before the shift process is stored in the line buffer for each line in the sub-scanning direction. In response to pixel data items corresponding to one line being transferred to the memory, the line buffer is cleared, and pixel data items corresponding to the succeeding line are stored in the line buffer. The pixel data items are stored in the area with consecutive addresses in the line buffer. However, if a pixel data item is shifted in the sub-scanning direction in the shift process, the address therefor is shifted by the shift amount in the storage target memory, and the pixel data items are not stored in the area with consecutive addresses in the memory. Pixel blocks in the line buffer that are not to be stored in the area with consecutive addresses in the memory are not allowed to be collectively transferred to the memory and are required to be transferred dividedly and sequentially. As the pixel blocks not allowed to be collectively transferred to the memory increase, the efficiency of a process for transferring pixel blocks to the memory becomes lower.

Aspects of non-limiting embodiments of the present disclosure relate to providing an image processing apparatus, a non-transitory computer readable medium, and a method for controlling an image processing apparatus by which efficiency in transferring pixel blocks to the memory is improved as compared with a case where the pixel blocks are processed in such a manner as to be stored in the line buffer on a per-line basis.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image processing apparatus including: a memory; a processor; and a first cache memory used by the processor, wherein the processor is configured to: store, in the first cache memory, pixel data items arranged in a line in a main-scanning direction, the pixel data items being stored in units of multiple lines; execute a shift process on multiple pixel data items stored in the first cache memory for each of pixel blocks to prevent deviation in a sub-scanning direction in forming an image, the pixel block being composed of a predetermined number of pixel data items and serving as a processing unit; and perform a storing process in which among the pixel data items in the multiple lines that are stored in the first cache memory, pixel data items to be stored in an area with consecutive addresses in the memory as a result of the shift process are collectively stored in the memory.

BRIEF DESCRIPTION OF THE DRAWINGS

An exemplary embodiment of the present disclosure will be described in detail based on the following figures, wherein.

DETAILED DESCRIPTION

Figure 1:
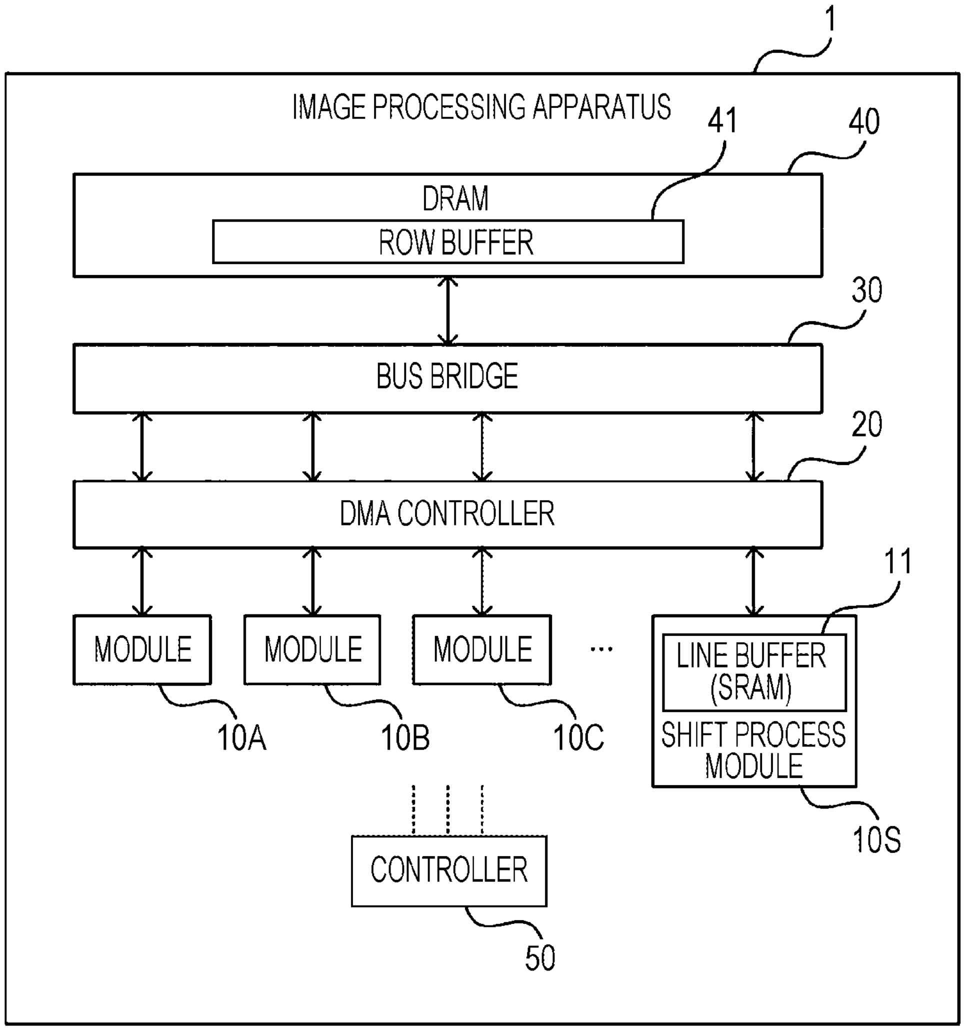
FIG. 1 is a view illustrating the configuration of an image processing apparatus taken as an example of a specific exemplary embodiment of the present disclosure.

Hereinafter, an exemplary embodiment according to the present disclosure will be described in detail on the basis of the drawings. FIG. 1 is a view illustrating the configuration of an image processing apparatus 1 taken as an example of a specific exemplary embodiment of the present disclosure.

The image processing apparatus 1 performs image processing on image data (including image data regarding an image of characters, numerical values, and symbols only). The image processing apparatus 1 performs the image processing, for example, on image data acquired from an external apparatus such as a computer or on image data read by a scanner or the like. Image data after the image processing by the image processing apparatus 1 is used to form an image in an image forming process. An image corresponding to the image data after the image processing is printed on the medium such as paper in a printing process using, for example, light emitting diodes (LEDs).

The image processing apparatus 1 includes multiple modules 10A, 10B, 10C, and 10S, a direct memory access (DMA) controller 20, a bus bridge 30, a dynamic random access memory (DRAM) 40, and a controller 50. The DRAM 40 is an example of a memory in the technology of the present disclosure.

The modules 10A to 10C and 10S perform the image processing on the image data. The image processing appropriate for a corresponding one of the modules 10A to 10C and 10S is sequentially performed in the order of, for example, the module 10A, the module 10B, the module 10C, and . . . .

The modules 10A to 10C and 10S each include a path to an image processing line buffer in the DRAM 40. Specifically, DMA transfer controlled by the DMA controller 20 causes data to be written from one of the modules (10A to 10C and 10S) to the DRAM 40 and to be read from the DRAM 40 into one of the modules (10A to 10C and 10S). The writing and the reading are performed via the bus bridge 30.

The modules 10A to 10C and 10S include the shift process module 10S. The shift process module 10S is able to use a line buffer 11. The line buffer 11 is an example of a first cache memory in the technology of the present disclosure. The shift process module 10S executes the shift process on the image data. The shift process will be described in detail later.

The modules 10A to 10C and 10S included in the image processing apparatus 1 in FIG. 1 are implemented by using hardware such as an image processing processor.

Figure 2:
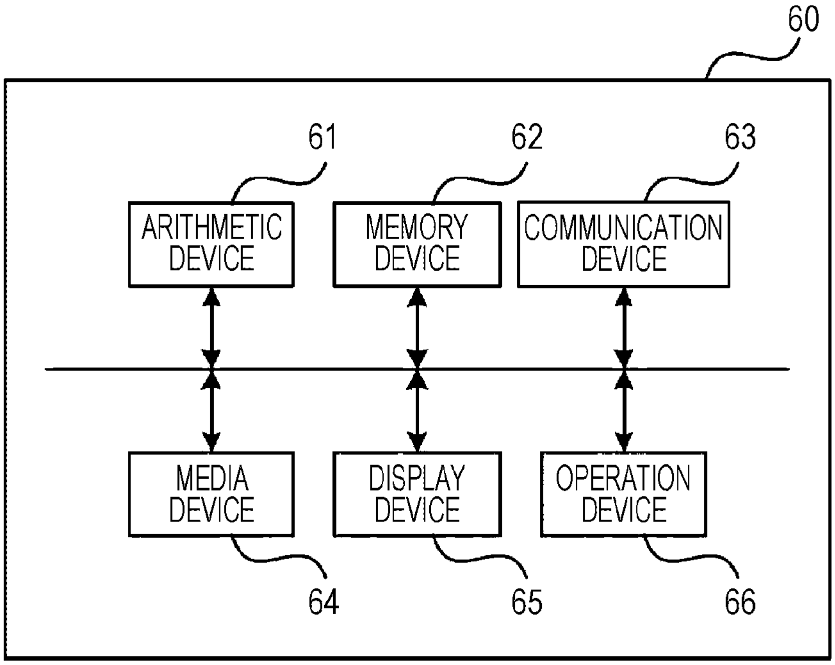
FIG. 2 is a view of the configuration of a computer included in the image processing apparatus above.

The image processing apparatus 1 in FIG. 1 is implemented by using, for example, a computer 60 as illustrated in FIG. 2. The computer 60 has hardware resources such as an arithmetic device 61 such as a central processing unit (CPU), a memory device 62 such as a memory and/or a hard disk, a communication device 63 using a communication network such as the Internet, a media device 64 that receives data from a storage media such as an optical disk and/or a semiconductor memory, a display device 65 such as a display, and as an operation device 66 that receives an operation from a user. The arithmetic device 61 is an example of a processor in the technology of the present disclosure.

A program (software) appropriate for at least part of the functions of the components denoted by reference numerals in the image processing apparatus 1 illustrated, for example, in FIG. 1 is loaded in the computer 60, and the at least part of the functions of the image processing apparatus 1 is implemented by the computer 60 in cooperation between the hardware resources of the computer 60 and the loaded software. The program may be provided to the computer 60 via a communication network such as the Internet or in such a manner as to be stored in a storage medium such as an optical disk or a semiconductor memory.

The overall configuration of the image processing apparatus 1 has heretofore been described. Functions and the like implemented by the image processing apparatus 1 will then be described in detail.

Figure 3A:
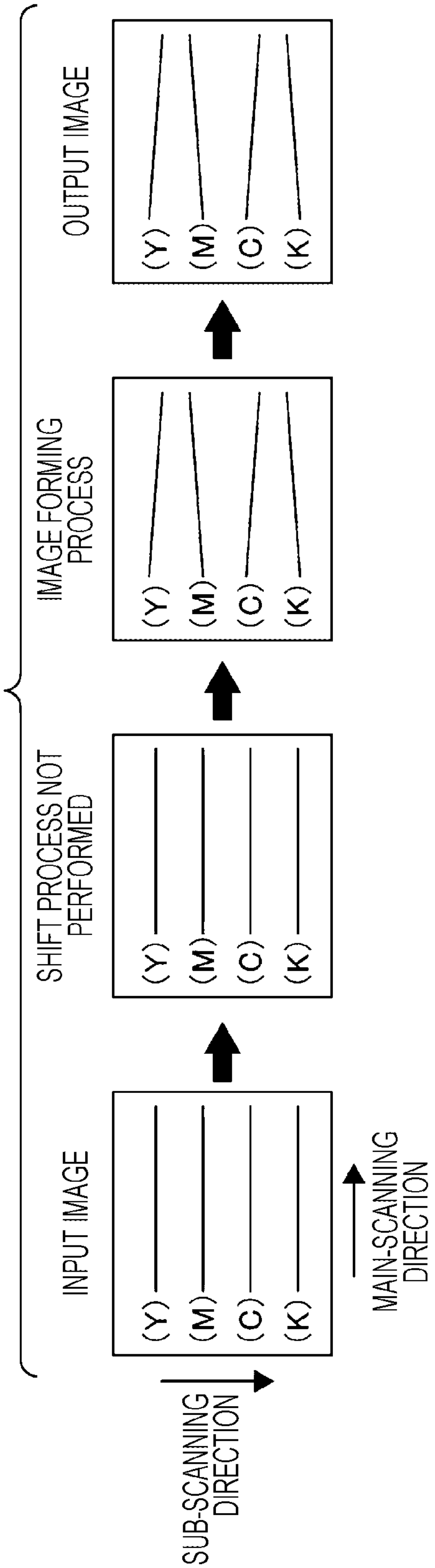
FIGS. 3A and 3B are each a view illustrating a specific example of the shift process.
Figure 3B:
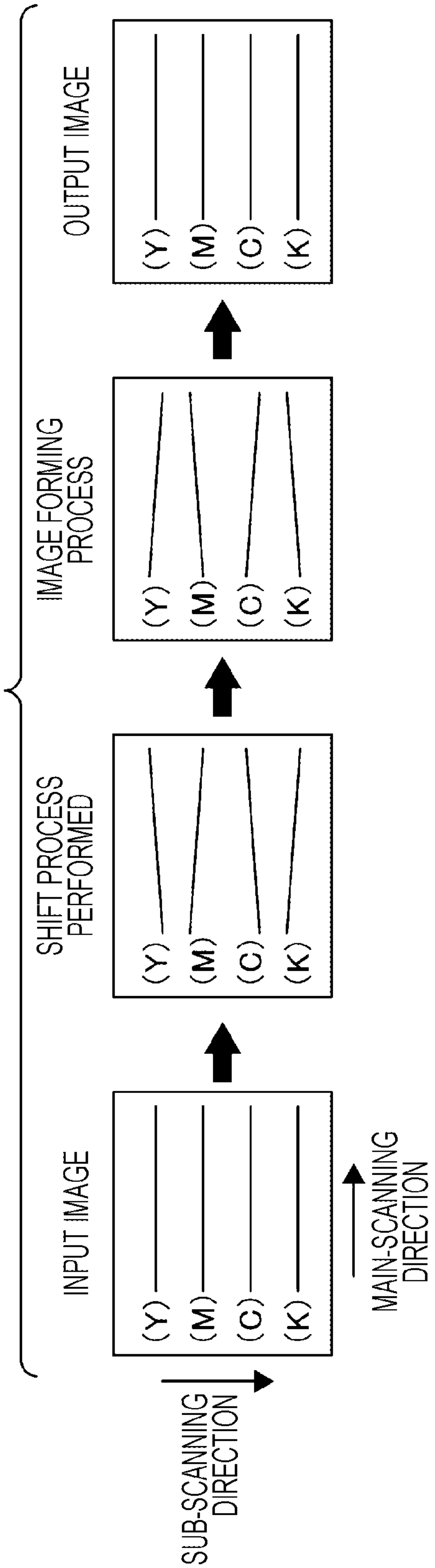

FIGS. 3A and 3B are each a view illustrating a specific example of the shift process. In the specific example illustrated in FIGS. 3A and 3B, a two-dimensional output image to be formed on the medium such as paper is formed in the image forming process in which an image forming operation in a main-scanning direction (a direction along a line) is repeated in such a manner as to be moved in a sub-scanning direction. For a color image, the image forming is performed by using LED print heads for respective four color toners, for example, yellow (Y), magenta (M), cyan (C), and black (K). One line in the color image is formed by a set of four lines corresponding to, for example, the four colors (four toners) as YMCK.

However, if an image is formed on the medium by using, for example, the LED print heads or the like, manufacturing variations or the like in the LED print heads causes a line to deviate from an ideal main-scanning direction in designing, and, for example, a line skewed with respect to the main-scanning direction is formed. To prevent such deviation (such as skew) in the sub-scanning direction in the image forming, the shift process in the sub-scanning direction is executed.

FIG. 3A illustrates a specific example of the image forming in which the shift process is disabled. If the image forming process is executed without executing the shift process on an input image, a line skewed with respect to the main-scanning direction is formed in the image forming process. As illustrated, for example, in the specific example in FIG. 3A, an output image in which lines corresponding to the respective four YMCA color toners are skewed is thereby formed.

In contrast, FIG. 3B illustrates a specific example of the image forming in which the shift process is enabled. In the shift process, in the image forming process, the input image is shifted in a direction opposite to the direction of the deviation occurring in the sub-scanning direction. Lines of pixels forming the input image are shifted in the sub-scanning direction (that is, the pixel position movement) in accordance with, for example, the respective four YMCA color toners.

Intentional deviation caused by the shift process and deviation occurring in the image forming process cancel each other out, and thereby the deviation in the sub-scanning direction is prevented. As illustrated, for example, in the specific example in FIG. 3B, an output image in which the line skew is prevented (for example, without the line skew) is thereby formed.

The shift process module 10S executes the shift process as described above on image data stored in the DRAM 40.

Figure 4:
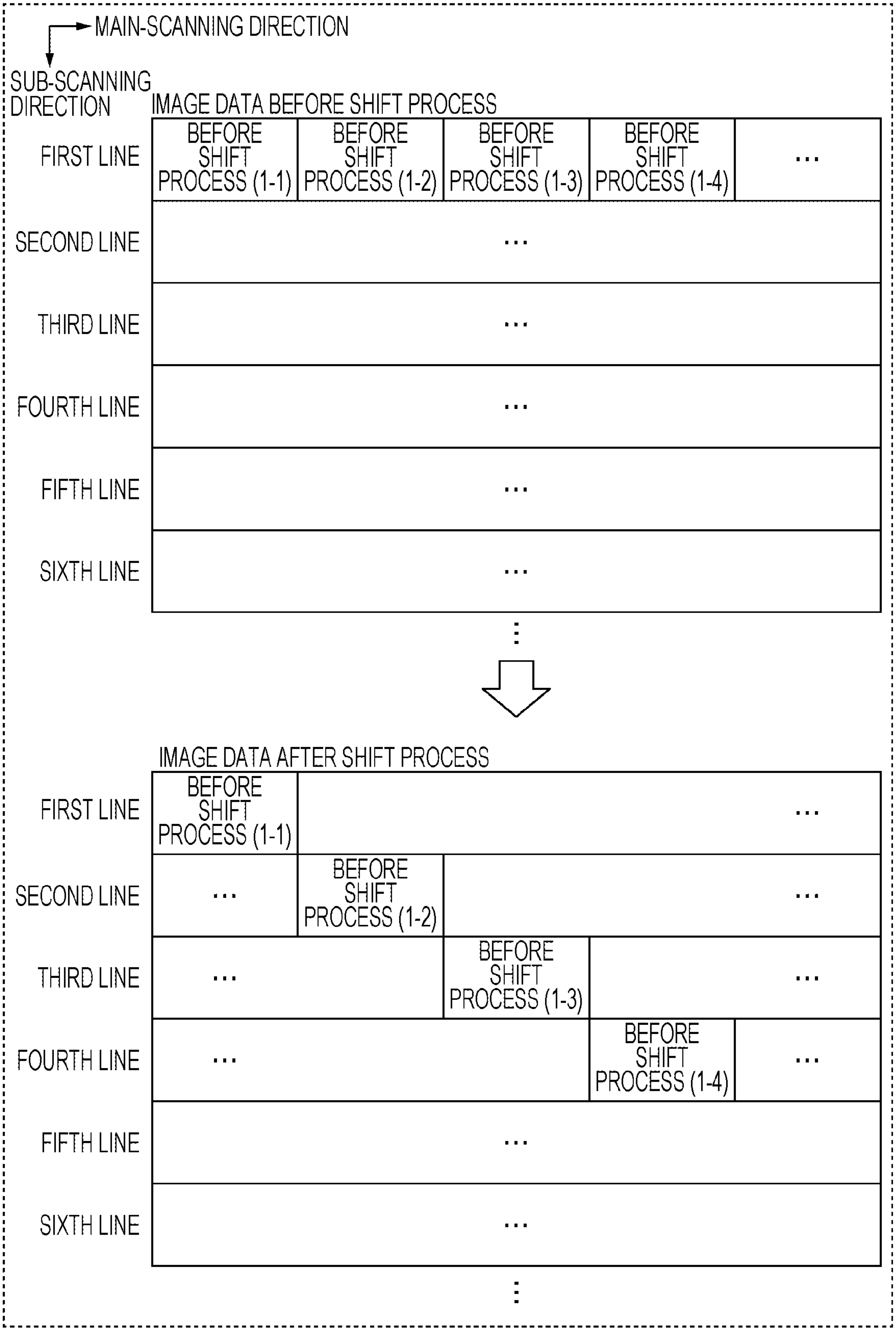
FIG. 4 is a view illustrating a specific example of the data configurations of image data before a shift process and after the shift process.

FIG. 4 is a view illustrating a specific example of data configurations before and after the shift process for image data. The image data is composed of multiple lines, and each line is composed of multiple pixel data items.

In the specific example illustrated in FIG. 4, multiple pixel data items are stored as image data before the shift process in the DRAM 40 in the order of arrangement in the image data. Each pixel data item is assigned an address in order from the top line and from the top pixel in each line.

In the course of the shift process in the shift process module 10S, the image data before the shift process stored in the DRAM 40 is first transferred to the line buffer 11 in units of a fixed data amount.

As the shift process executed by the shift process module 10S on the line buffer 11, the input image is then shifted in a direction opposite to the direction of the deviation occurring in the image forming process. The input image is shifted to prevent the deviation in the sub-scanning direction in the image forming process for each pixel block composed of a predetermined number of pixel data items and serving as a unit of processing (see FIG. 3).

For example, in the specific example illustrated in FIG. 4, each of the pixel blocks before the shift process such as a pixel block (1-1), a pixel block (1-2), a pixel block (1-3), and a pixel block (1-4) is composed of pixel data items corresponding to 16 pixels (16 bytes). Each pixel block serves as a minimum correction unit in the shift process. It goes without saying that the minimum correction unit may be multiple pixels other than the 16 pixels and may also be one pixel.

The reference numeral (m−n) of the pixel blocks denotes an nth pixel block in the mth line with respect to its origin.

The image data after the shift process is transferred from the line buffer 11 to the DRAM 40 and is stored in the DRAM 40.

Transferring the pixel data item from the line buffer 11 to the DRAM 40 requires processes for starting the transfer, terminating the transfer, designating a write destination address, and the like to be performed in units of a fixed data amount. However, if addresses in the writing to the DRAM 40 are consecutive data items, the data items may be efficiently transferred what is called burst transfer in which a predetermined process is first executed and thereafter the data items are consecutively transferred.

As the line buffer 11 used by the shift process module 10S, for example, a static random access memory (SRAM) is used. The SRAM is a memory able to operate at a higher speed than the speed of the operation of the DRAM 40. However, a memory having a lower capacity than that of the DRAM 40 is typically used due to cost or the like.

For example, if the capacity of the line buffer 11 is a data amount corresponding to one line in the image data before the shift process, the image data before the shift process stored in the DRAM 40 is transferred to the line buffer 11 in units of the data amount corresponding to one line, the shift process is executed on the line buffer 11 by the shift process module 10S, and thereafter the image data is transferred from the line buffer 11 to the DRAM 40 and is stored in the DRAM 40.

As illustrated in FIG. 4, the pixel block (1-1), the pixel block (1-2), the pixel block (1-3), and the pixel block (1-4) have the pixel data items having the consecutive addresses in one line in the image data before the shift process, but the shift process causes data to be included in lines on occasions.

Thus the pixel block (1-1) and the pixel block (1-2) are not allowed to be transferred collectively from the line buffer 11 to the DRAM 40 and are required to be transferred dividedly and sequentially.

Likewise, the pixel block (1-2) and the pixel block (1-3) as well as the pixel block (1-3) and the pixel block (1-4) are not allowed to be transferred collectively from the line buffer 11 to the DRAM 40 and are required to be transferred dividedly and sequentially.

If the addresses of pixel blocks are not consecutive in writing the pixel data items to the DRAM 40, the length of data items allowed to be transferred to the DRAM 40 in one-time burst transfer is shorter than that in a case where the addresses of pixel blocks are consecutive in writing pixel data items to the DRAM 40.

In transferring the pixel data items after the shift process from the line buffer 11 to the DRAM 40, the number of times of the burst transfer is thus increased, processes other than the data transfer, such as starting the transfer and terminating the transfer are increased, and data transfer efficiency is lowered.

Hence, the controller 50 of this exemplary embodiment stores, in the line buffer 11, pixel data items arranged in a line in the main-scanning direction in units of multiple lines and executes the shift process and a storing process. The shift process is executed on the multiple pixel data items stored in the line buffer 11 for each pixel block composed of a predetermined number of pixel data items and serving as the processing unit. In the storing process, among the pixel data items in the multiple lines that are stored in the line buffer 11, pixel data items to be stored in an area with consecutive addresses in the DRAM 40 as the result of the shift process are stored collectively in the DRAM 40.

In this exemplary embodiment, in the storing process, the controller 50 may collectively store, in the DRAM 40 for each pixel block, pixel data items in the pixel block and pixel data items in a neighboring pixel block neighboring the pixel block, the pixel block and the neighboring pixel block having consecutive addresses, the pixel data items being collectively stored in the main-scanning direction in order from the position of the origin in the pixel data items in the multiple lines that are stored in the line buffer 11.

The controller 50 may provide a pixel data item already stored in the DRAM 40 of the pixel data items stored in the line buffer 11 with an identification indicating that the pixel data item has been stored and may exclude the pixel data item provided with the identification from a target for the storing process.

The line buffer 11 may have a lower capacity than the entire data amount of the image data.

In this case, in response to the completion of the storing process for all of the pixel data items in one line among the pixel data items in the multiple lines that are stored in the line buffer 11, the controller 50 may store, in an area of the line buffer 11, pixel data items in a line succeeding the line of the pixel data items stored in the line buffer 11, the area having been used to store the pixel data items in the line for which the storing process is completed, the pixel data items being stored at a time point when the storing process for all of the pixel data items in the line is completed.

If the DRAM 40 includes a row buffer 41, the controller 50 may store the pixel data items in the row buffer 41 in the storing process. The storing process using the row buffer 41 achieves high-speed data writing to the DRAM 40. The row buffer 41 is an example of a second cache memory in the technology of the present disclosure.

Hereinafter, the shift process in the image processing apparatus 1 of this exemplary embodiment will be described in detail with reference to FIGS. 5 to 10.

To simplify explanation, a case where one line is composed of four pixel blocks is taken as an example in the explanation, and a case where the number of lines including the pixel data items to be stored in the line buffer 11 is 3 is described as an example.

Figure 5:
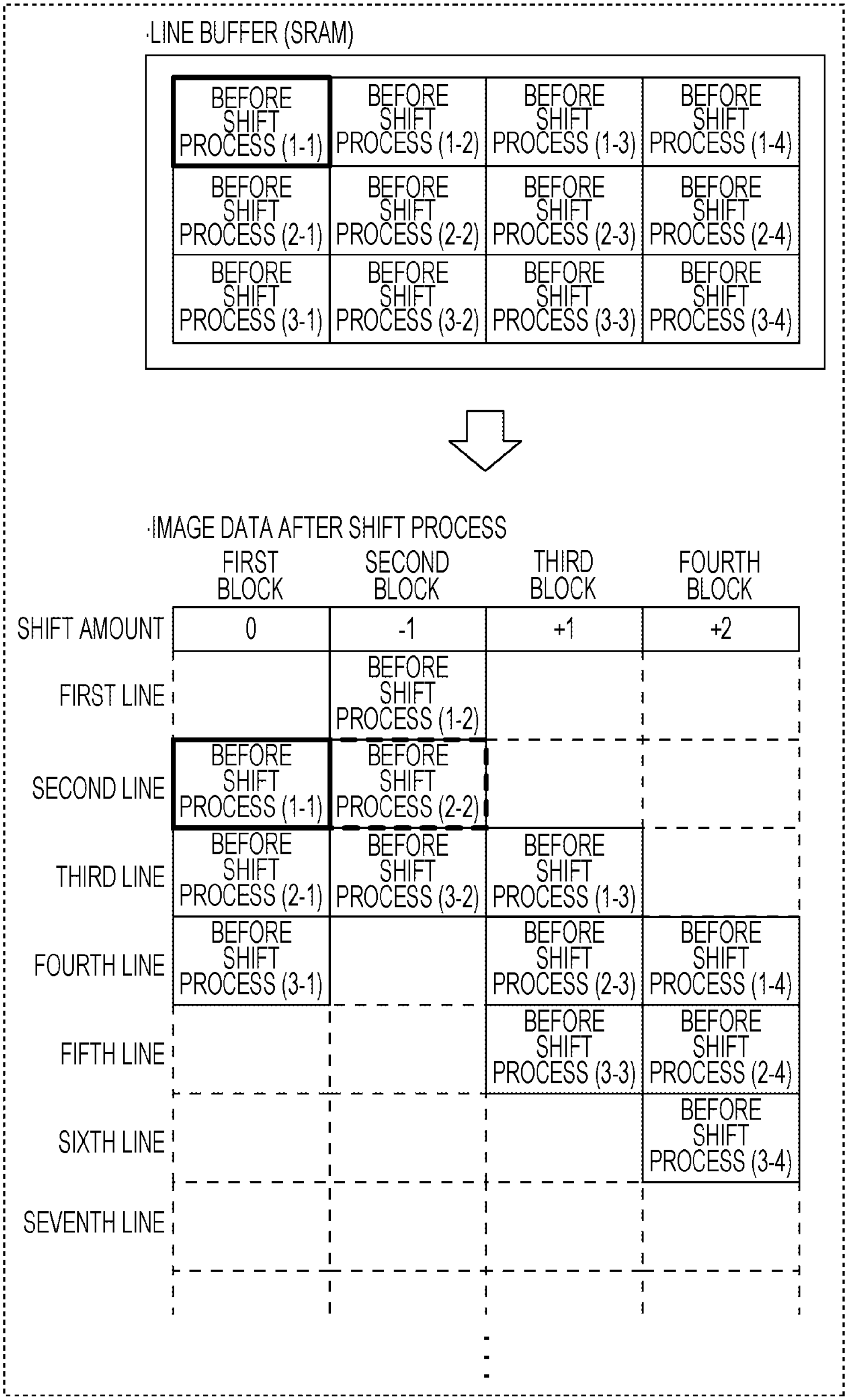
FIG. 5 is a view for explaining the details of the shift process in the image processing apparatus above.

As illustrated in FIG. 5, the controller 50 sets a pixel block of interest in order from the origin in the image before the shift process. The origin in the image is located, for example, at the upper left corner in this example. The pixel block (1-1) in FIG. 5 is thus the first pixel block of interest. In FIGS. 5 to 10, a pixel block set as a pixel block of interest is displayed by using a thick solid line frame.

The controller 50 then acquires pixel data items arranged in a line in the main-scanning direction and corresponding to three lines including the pixel block of interest (1-1) in the image data before the shift process stored in the DRAM 40 and stores the pixel data items in the line buffer 11.

The controller 50 then causes the shift process module 10S to execute the shift process in the sub-scanning direction on the pixel data items stored in the line buffer 11.

In a specific example of the shift process, with respect to a pixel block (m-1) at the left end, a pixel block (m-2) as a second pixel block from the left is shifted by minus one line, a pixel block (m-3) as a third pixel block from the left is shifted by plus one line, and a pixel block (m-4) as a fourth pixel block from the left is shifted by plus two lines.

As the result, the pixel data items stored in the line buffer 11 in the image after the shift process has a positional relationship as illustrated in the corrected image in FIG. 5.

The controller 50 then determines whether there is a pixel block neighboring the pixel block of interest (1-1) on the right or left side in the same line in the image after the shift process. In the example illustrated in FIG. 5, the pixel block of interest (1-1) and a pixel block (2-2) are consecutive pixel blocks. In FIGS. 5 to 10, a pixel block that neighbors a pixel block of interest and that is to be transferred together with the pixel block of interest in the burst transfer mode is represented by using a thick dotted line frame in the image after the shift process.

The controller 50 then transfers the pixel data items of the pixel block of interest (1-1) and the pixel block (2-2) from the line buffer 11 to the DRAM 40 in the burst transfer mode.

Figure 6:
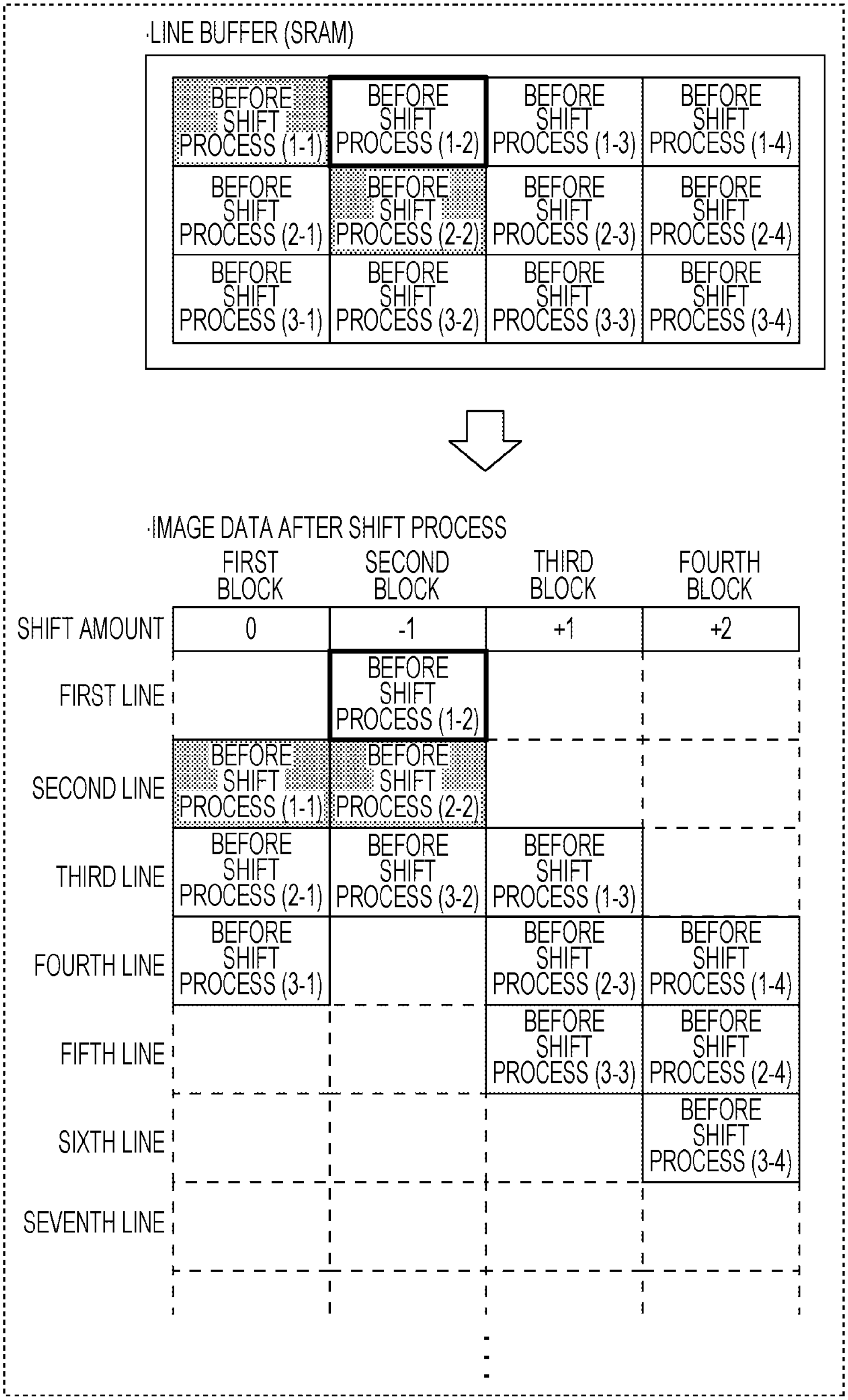
FIG. 6 is a view for explaining the details of the shift process in the image processing apparatus above.

The controller 50 then provides the pixel block already stored in the DRAM 40 with an identification indicating that the pixel block has been stored, as illustrated in FIG. 6. The pixel block provided with the identification is excluded from the target for the succeeding storing processes. In FIGS. 6 to 10, a pixel block provided with an identification is displayed in gray. The storing process for one pixel block of interest is thereby completed.

As described above, in response to the completion of the storing process for the pixel block of interest (1-1), the controller 50 sets the pixel block (1-2) as the next pixel block of interest (1-2), the pixel block (1-2) neighboring the pixel block (1-1) on the right side in the image data before the shift process.

The controller 50 then determines whether there is a pixel block neighboring the pixel block of interest (1-2) on the right or left side in the same line in the image after the shift process. In the example illustrated in FIG. 6, there is no pixel block neighboring the pixel block of interest (1-2).

The controller 50 then transfers the pixel data items of only the pixel block of interest (1-2) from the line buffer 11 to the DRAM 40 in the burst transfer mode.

Figure 7:
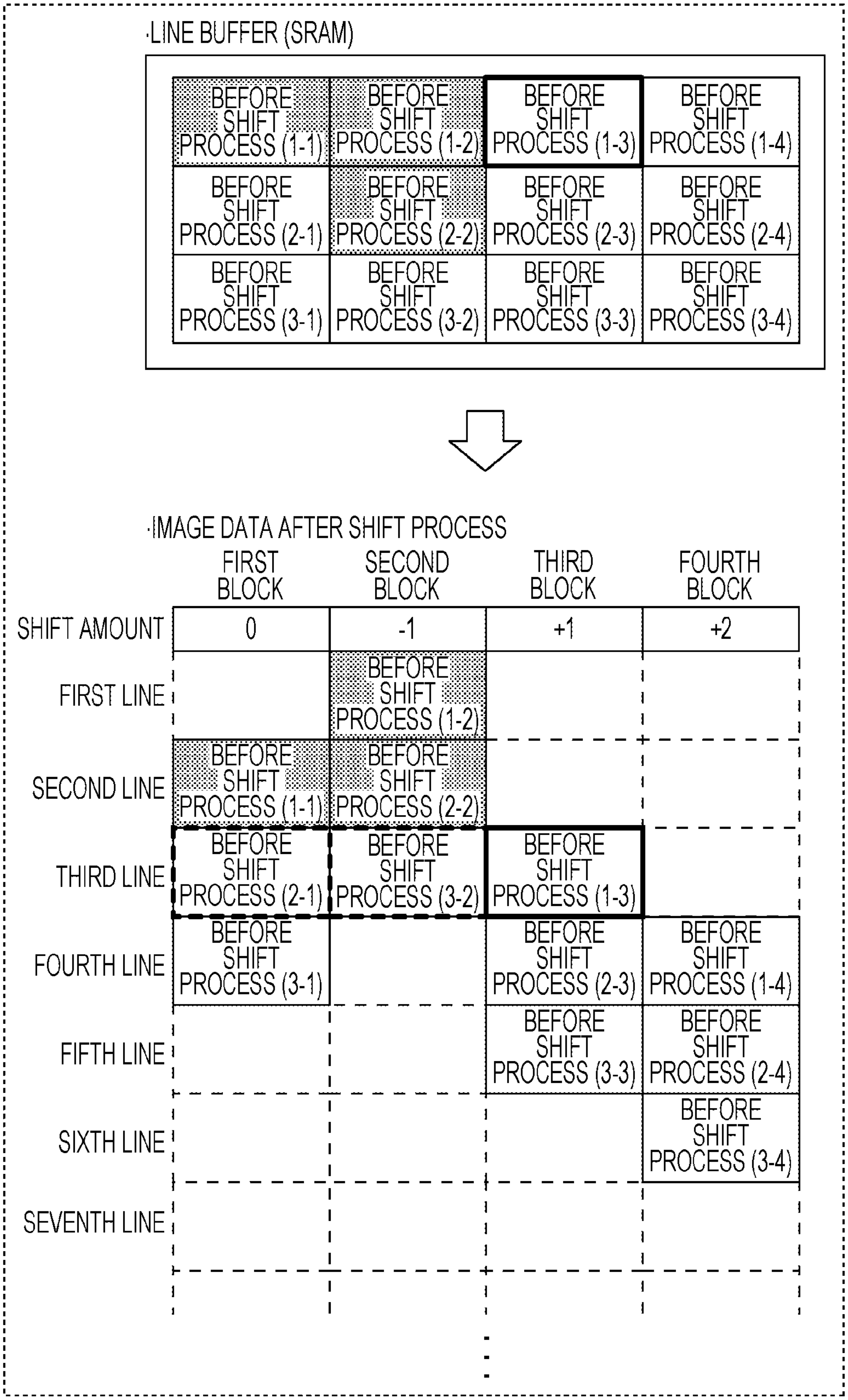
FIG. 7 is a view for explaining the details of the shift process in the image processing apparatus above.

The controller 50 then provides the pixel block already stored in the DRAM 40 with the identification indicating that the pixel block has been stored and completes the storing process for the pixel block of interest (1-2) as illustrated in FIG. 7.

As described above, in response to the completion of the storing process for the pixel block of interest (1-2), the controller 50 sets the pixel block (1-3) as the next pixel block of interest (1-3), the pixel block (1-3) neighboring the pixel block (1-2) on the right side in the image data before the shift process.

The controller 50 then determines whether there is a pixel block neighboring the pixel block of interest (1-3) on the right or left side in the same line in the image after the shift process. In the example illustrated in FIG. 7, a pixel block (2-1), a pixel block (3-2), and the pixel block of interest (1-3) are consecutive pixel blocks.

The controller 50 then transfers the pixel data items of the pixel block (2-1), the pixel block (3-2), and the pixel block of interest (1-3) from the line buffer 11 to the DRAM 40 in the burst transfer mode.

Figure 8:
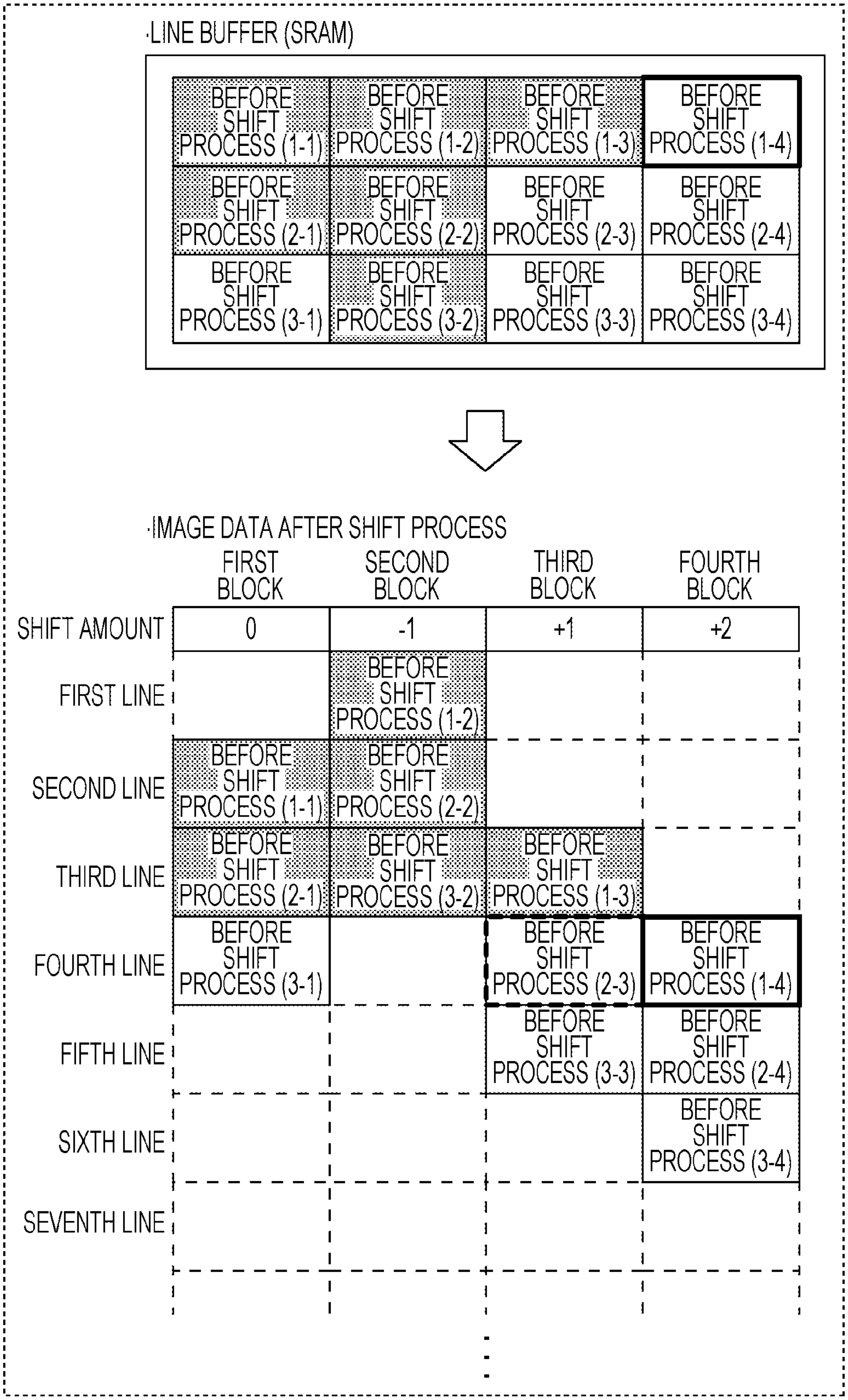
FIG. 8 is a view for explaining the details of the shift process in the image processing apparatus above.

The controller 50 then provides the pixel block already stored in the DRAM 40 with the identification indicating that the pixel block has been stored and completes the storing process for the pixel block of interest (1-3) as illustrated in FIG. 8.

As described above, in response to the completion of the storing process for the pixel block of interest (1-3), the controller 50 sets the pixel block (1-4) as the next pixel block of interest (1-4), the pixel block (1-4) neighboring the pixel block (1-3) on the right side in the image data before the shift process.

The controller 50 then determines whether there is a pixel block neighboring the pixel block of interest (1-4) on the right or left side in the same line in the image after the shift process. In the example illustrated in FIG. 8, a pixel block (2-3) and the pixel block of interest (1-4) are consecutive pixel blocks.

The controller 50 then transfers the pixel data items of the pixel block (2-3) and the pixel block of interest (1-4) from the line buffer 11 to the DRAM 40 in the burst transfer mode.

Figure 9:
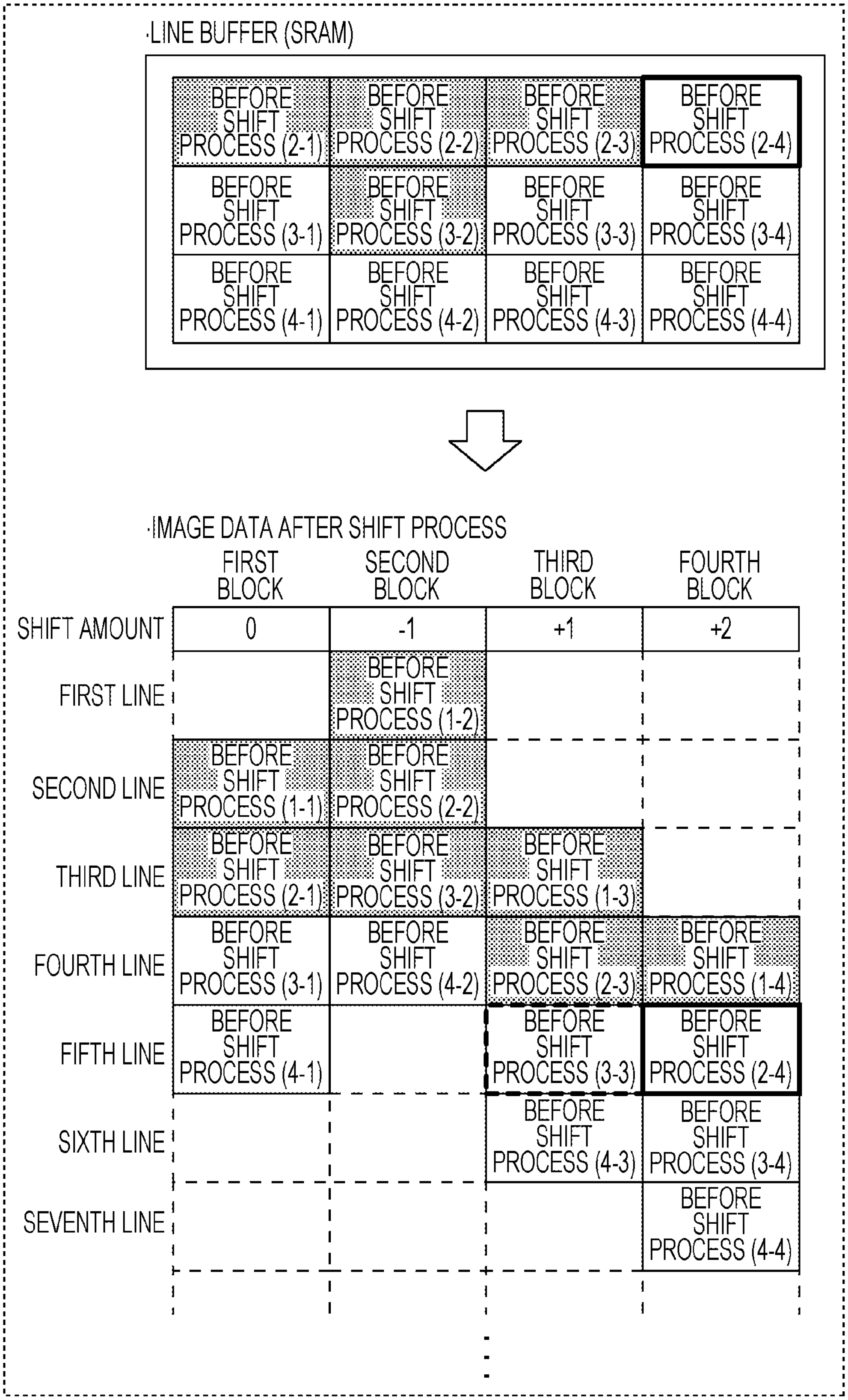
FIG. 9 is a view for explaining the details of the shift process in the image processing apparatus above.

The controller 50 then provides the pixel block already stored in the DRAM 40 with the identification indicating that the pixel block has been stored and completes the storing process for the pixel block of interest (1-4) as illustrated in FIG. 9.

Since the storing processes for the pixel blocks in the first line are all completed in response to the completion of the storing process for the pixel block of interest (1-4), the controller 50 sets a pixel block of interest in order from the left in the second line that is a line succeeding the line including the pixel block (1-4) in the image data before the shift process.

However, since the pixel block (2-1), the pixel block (2-2), and the pixel block (2-3) in the second line are provided with the identification that the pixel blocks have been stored in this example, the controller 50 sets a pixel block (2-4) that is the leftmost of pixel blocks without the identification in the second line, as the next pixel block of interest (2-4).

Since the storing processes for the pixel blocks in the first line are all completed, the controller 50 overwrites the pixel data items in the first line in the storage area of the line buffer 11 with pixel data items in the fourth line. For explanation, in FIG. 9 and FIG. 10 (described later), data items in the line buffer 11 are illustrated in the order of arrangement in the image before the shift process.

The controller 50 then determines whether there is a pixel block neighboring the pixel block of interest (2-4) on the right or left side in the same line in the image after the shift process. In the example illustrated in FIG. 9, a pixel block (3-3) and the pixel block of interest (2-4) are consecutive pixel blocks.

The controller 50 then transfers the pixel data items of the pixel block (3-3) and the pixel block of interest (3-4) from the line buffer 11 to the DRAM 40 in the burst transfer mode.

Figure 10:
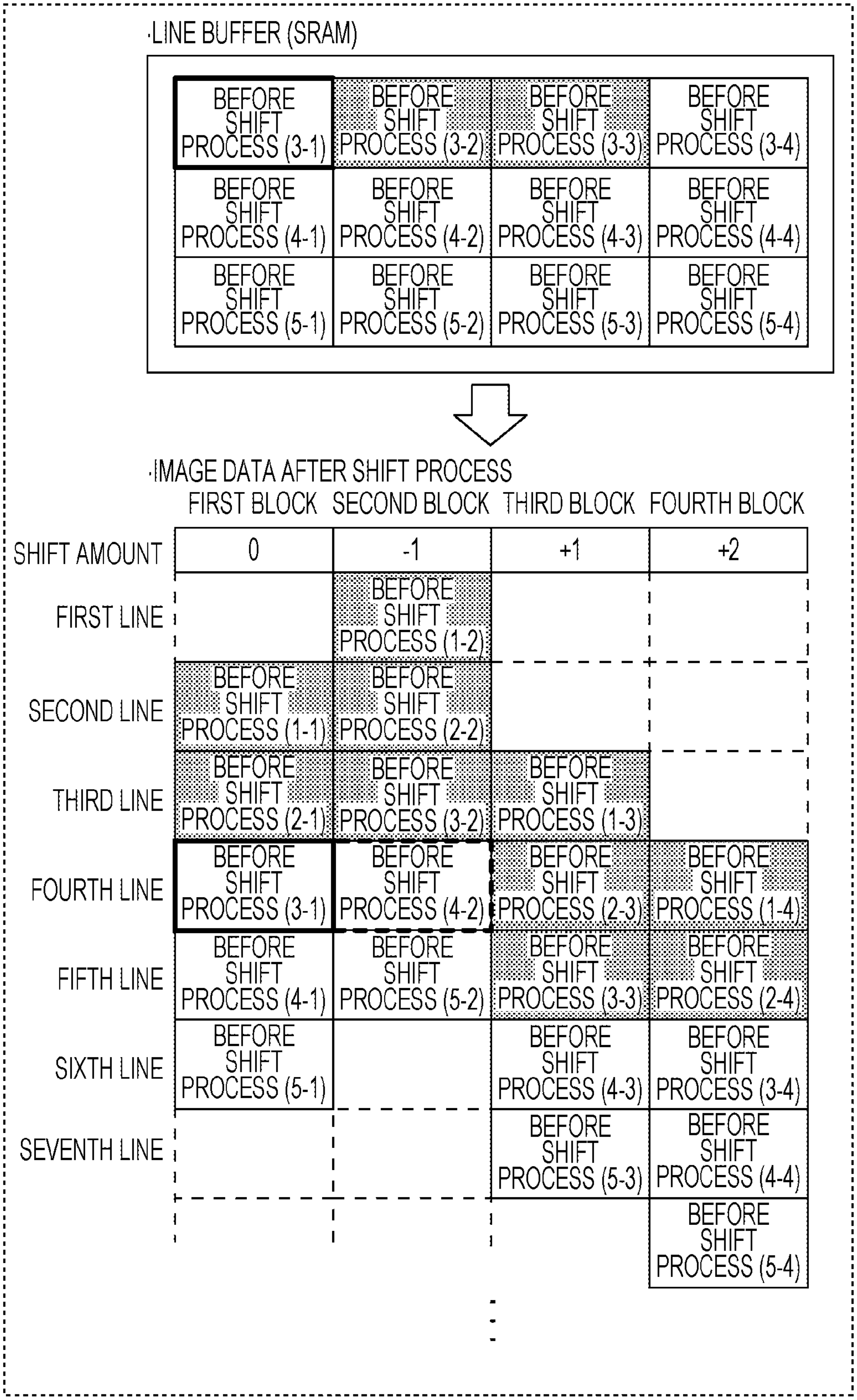
FIG. 10 is a view for explaining the details of the shift process in the image processing apparatus above.

The controller 50 then provides the pixel block already stored in the DRAM 40 with the identification indicating that the pixel block has been stored and completes the storing process for the pixel block of interest (2-4) as illustrated in FIG. 10.

Since the storing processes for the pixel blocks in the second line are all completed in response to the completion of the storing process for the pixel block of interest (2-4), the controller 50 sets a pixel block of interest in order from the left in the third line that is a line succeeding the line including the pixel block (2-4) in the image data before the shift process.

The controller 50 sets a pixel block (3-1) that is the leftmost of pixel blocks without the identification in the third line, as the next pixel block of interest (3-1).

Since the storing processes for the pixel blocks in the second line are all completed, the controller 50 overwrites the pixel data items in the second line in the storage area in the line buffer 11 with pixel data items in the fifth line.

The controller 50 then determines whether there is a pixel block neighboring the pixel block of interest (3-1) on the right or left side in the same line in the image after the shift process. In the example illustrated in FIG. 10, the pixel block of interest (3-1), a pixel block (4-2), the pixel block (2-3), and the pixel block (1-4) are consecutive pixel blocks.

However, since the pixel block (2-3) and the pixel block (1-4) of these pixel blocks are provided with the identification, the storing process is not performed on the pixel block (2-3) and the pixel block (1-4).

Accordingly, the controller 50 transfers the pixel data items of the pixel block of interest (3-1) and the pixel block (4-2) from the line buffer 11 to the DRAM 40 in the burst transfer mode.

The controller 50 then provides the pixel block already stored in the DRAM 40 with the identification indicating that the pixel block has been stored and completes the storing process for the pixel block of interest (3-1).

The controller 50 thereafter repeats the process described above until the storing process for all of the pixel blocks in the image data before the shift process is completed.

In the exemplary embodiment above, the line buffer 11 has a lower capacity than the data amount of the entire image data but may have a capacity higher than or equivalent to the data amount of the entire image data.

The DRAM 40 does not have to include the row buffer 41. In this case, the controller 50 may directly store the pixel data items in the DRAM 40 in the storing process.

Modification

The image processing apparatus of an exemplary embodiment of the present disclosure has heretofore been described. However, the present disclosure is not limited to the exemplary embodiment above and may also be changed appropriately.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

An image processing apparatus includes:
a memory;
a processor; and
a first cache memory used by the processor.
The processor is configured to:
store, in the first cache memory, pixel data items arranged in a line in a main-scanning direction, the pixel data items being stored in units of multiple lines;
execute a shift process on multiple pixel data items stored in the first cache memory for each of pixel blocks to prevent deviation in a sub-scanning direction in forming an image, the pixel block being composed of a predetermined number of pixel data items and serving as a processing unit; and
perform a storing process in which among the pixel data items in the multiple lines that are stored in the first cache memory, pixel data items to be stored in an area with consecutive addresses in the memory as a result of the shift process are collectively stored in the memory.

(((2)))

In the image processing apparatus according to (((1))), the processor is configured to:
in the storing process, collectively store, in the memory for each pixel block, pixel data items in the pixel block and pixel data items in a neighboring pixel block neighboring the pixel block, the pixel block and the neighboring pixel block having consecutive addresses, the pixel data items being collectively stored in the main-scanning direction in order from a position of an origin in the pixel data items in the multiple lines that are stored in the first cache memory.

(((3)))

In the image processing apparatus according to (((2))), the processor is configured to:
provide each of the pixel data items already stored in the memory with an identification indicating that the pixel data item has been stored and exclude the pixel data item provided with the identification from a target for the storing process.

(((4)))

In the image processing apparatus according to any one of (((1))) to (((3))),
the first cache memory has a lower capacity than a capacity of an entire data amount of the image.

(((5)))

In the image processing apparatus according to (((4))), the processor is configured to:
in response to completion of the storing process for all of the pixel data items in one line of the pixel data items in the multiple lines that are stored in the first cache memory, store, in an area of the first cache memory, pixel data items in a line succeeding a line of the pixel data items stored in the first cache memory, the area having been used to store the pixel data items in the line for which the storing process is completed, the pixel data items being stored at a time point when the storing process for all of the pixel data items in the line is completed.

(((6)))

In the image processing apparatus according to any one of (((1))) to (((5))),
the memory has a second cache memory, and
the processor is configured to:
store the pixel data items in the second cache memory in the storing process.

(((7)))

A program causes a computer to execute a process for controlling an image processing apparatus including a processor and a first cache memory used by the processor, the process including:

storing, in the first cache memory, pixel data items arranged in a line in a main-scanning direction, the pixel data items being stored in units of multiple lines;

executing a shift process on multiple pixel data items stored in the first cache memory for each of pixel blocks to prevent deviation in a sub-scanning direction in forming an image, the pixel block being composed of a predetermined number of pixel data items and serving as a processing unit; and performing a storing process in which among the pixel data items in the multiple lines that are stored in the first cache memory, pixel data items to be stored in an area with consecutive addresses in the memory as a result of the shift process are collectively stored in the memory.

What is claimed is:

1. An image processing apparatus comprising:

a memory;

a processor; and a first cache memory used by the processor, wherein the processor is configured to:

store, in the first cache memory, pixel data items arranged in a line in a main-scanning direction, the pixel data items being stored in units of a plurality of lines;

execute a shift process on a plurality of pixel data items stored in the first cache memory for each of pixel blocks to prevent deviation in a sub-scanning direction in forming an image, the pixel block being composed of a predetermined number of pixel data items and serving as a processing unit; and without further processing on the plurality of pixel data items on which the shift process has been performed, perform a storing process in which among the pixel data items in the plurality of lines that are stored in the first cache memory, pixel data items to be stored in an area with consecutive addresses in the memory as a result of the shift process are collectively stored in the memory.

2. The image processing apparatus according to claim 1, wherein the processor is configured to:

in the storing process, collectively store, in the memory for each pixel block, pixel data items in the pixel block and pixel data items in a neighboring pixel block neighboring the pixel block, the pixel block and the neighboring pixel block having consecutive addresses, the pixel data items being collectively stored in the main-scanning direction in order from a position of an origin in the pixel data items in the plurality of lines that are stored in the first cache memory.

3. The image processing apparatus according to claim 2, wherein the processor is configured to:

provide each of the pixel data items already stored in the memory with an identification indicating that the pixel data item has been stored and exclude the pixel data item provided with the identification from a target for the storing process.

4. The image processing apparatus according to claim 1, wherein the first cache memory has a lower capacity than a capacity of an entire data amount of the image.

5. The image processing apparatus according to claim 4, wherein the processor is configured to:

in response to completion of the storing process for all of the pixel data items in one line of the pixel data items in the plurality of lines that are stored in the first cache memory, store, in an area of the first cache memory, pixel data items in a line succeeding a line of the pixel data items stored in the first cache memory, the area having been used to store the pixel data items in the line for which the storing process is completed, the pixel data items being stored at a time point when the storing process for all of the pixel data items in the line is completed.

6. The image processing apparatus according to claim 1, wherein the memory has a second cache memory, and wherein the processor is configured to:

store the pixel data items in the second cache memory in the storing process.

7. A non-transitory computer readable medium storing a program causing a computer to execute a process for controlling an image processing apparatus including a processor and a first cache memory used by the processor, the process comprising:

storing, in the first cache memory, pixel data items arranged in a line in a main-scanning direction, the pixel data items being stored in units of a plurality of lines;

executing a shift process on a plurality of pixel data items stored in the first cache memory for each of pixel blocks to prevent deviation in a sub-scanning direction in forming an image, the pixel block being composed of a predetermined number of pixel data items and serving as a processing unit; and without further processing on the plurality of pixel data items on which the shift process has been performed, performing a storing process in which among the pixel data items in the plurality of lines that are stored in the first cache memory, pixel data items to be stored in an area with consecutive addresses in the memory as a result of the shift process are collectively stored in the memory.

8. A method for controlling an image processing apparatus including a processor and a first cache memory used by the processor, the method comprising:

storing, in the first cache memory, pixel data items arranged in a line in a main-scanning direction, the pixel data items being stored in units of a plurality of lines;

executing a shift process on a plurality of pixel data items stored in the first cache memory for each of pixel blocks to prevent deviation in a sub-scanning direction in forming an image, the pixel block being composed of a predetermined number of pixel data items and serving as a processing unit; and without further processing on the plurality of pixel data items on which the shift process has been performed performing a storing process in which among the pixel data items in the plurality of lines that are stored in the first cache memory, pixel data items to be stored in an area with consecutive addresses in the memory as a result of the shift process are collectively stored in the memory.

* * * * *